March 13, 1962 J. L. DE BOO 3,025,016

ADJUSTABLE WIDTH TAPE REEL

Filed Jan. 5, 1959

INVENTOR
JEROME L. DE BOO

BY R. C. Terry

ATTORNEY 3,025,016
ADJUSTABLE WIDTH TAPE REEL
Jerome L. De Boo, Barrington, Ill., assignor to Teletype Corporation, Chicago, Ill., a corporation of Delaware
Filed Jan. 5, 1959, Ser. No. 784,996
7 Claims. (Cl. 242—71.9)

This invention relates to a tape winding reel for use in tape systems and to a driving arrangement therefor.

In the operation of tape systems, and particularly telegraphic communication and data processing systems, it is highly desirable to have a universal winding reel which is readily adjustable to accommodate tapes of various widths and which is also low in cost and easy to manufacture.

It is also desirable in imparting rotation to devices such as tape reels, upon which material in the form of a strand or web accumulates, to increase the torque imparted to the reel as the mass of accumulated material increases.

An object of the invention is to achieve adjustability in a tape reel so as to accommodate tapes of different widths.

Another object of the invention is to employ a magnetic field for retaining a reel flange or head on its hub.

Another object of the invention is to vary the driving torque imparted to a reel directly as the mount of material carried by the reel varies.

A feature of the invention is the provision of a magnetic body mounted on the hub of a reel to attract and retain a reel head or disk composed of or including metallic material having magnetic properties.

Another feature of the invention is the employment of securing means for a reel head retaining body that operates internally and radially of the reel hub.

Another feature of the invention is the utilization of a yieldable mount for the supporting shaft of a tape reel such that the pressure between the reel and a frictionally engaging driving member varies in accordance with the weight of tape accumulated on the reel.

A complete understanding may be obtained from the following detailed description of the tape winding reel when read in conjunction with the appended drawings in which.

Figures 2, 3:
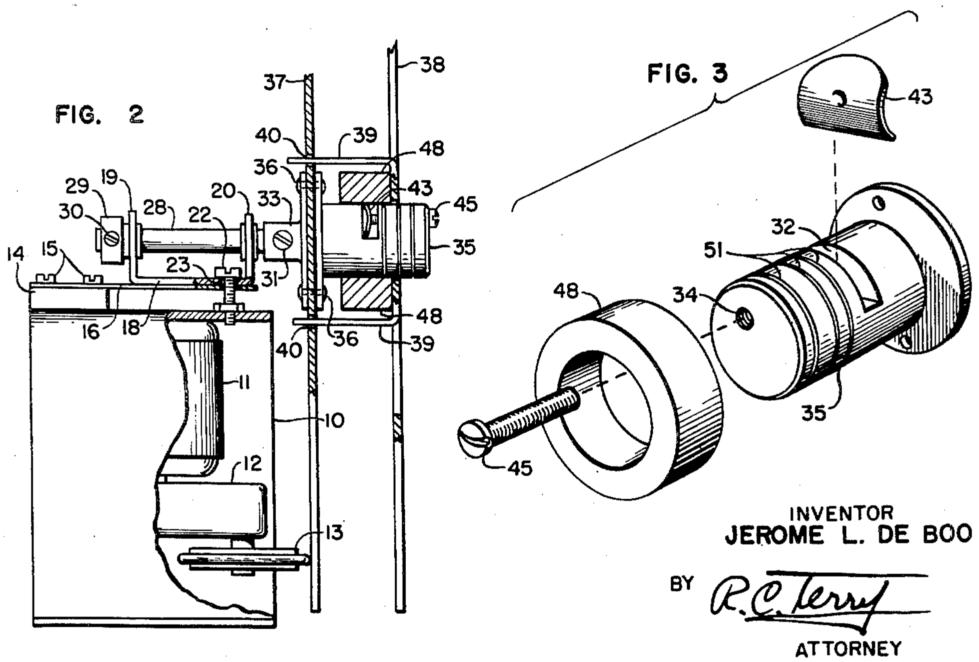
FIG. 2 is an elevational view of the tape reel, partly in section, to show the interrelationship of the working parts, and with parts broken away to show clearly the reel drive means.
FIG. 3 is an exploded view illustrating the manner in which the working parts are assembled.

Referring now to the drawings and more particularly to FIG. 2, there is shown a housing or base 10 which houses and supports a motor 11. Through suitable linkage 12, the motor 11 operates a drive wheel 13. Mounted on top of the housing 10 is a block 14 to which is secured, as by threaded fasteners 15, a yieldable cantilever member 16. A U-shaped support member 18, having legs 19 and 20, is secured in a convenient manner to the yieldable member 16. A screw 22, inserted within an over-sized aperture 23, provides an adjustable stop whereby the upper limit of movement of the yieldable member 16 and the U-shaped member 18 can be varied. Utilization of the yieldable member 16 for supporting the U-shaped support 18 permits the pressure between the reel 24 and the drive wheel 13 to vary in accordance with the weight of tape 26 accumulated on the reel. Thus a more positive driving connection between the drive wheel 13 and the reel 24 is achieved automatically upon an increased accumulation of the amount of tape 26. The screw 22 may be employed to set the minimum pressure between the reel and drive wheel 13.

Journaled in the legs 19 and 20 is a rotatable shaft 28. A retaining collar 29 is positioned on the shaft 28 by a set screw 30 to prevent the shaft from moving to the right. Fastened to the shaft 28 by means of a set screw 31 is a flanged sleeve 33 which, among other things, serves as a retaining collar to prevent the shaft from moving to the left. A hub 35, made of some non-magnetic material such as aluminum, and a disk 37 are secured fixedly to the flanged sleeve 33 in any convenient manner, such as by rivets 36.

Figure 1:
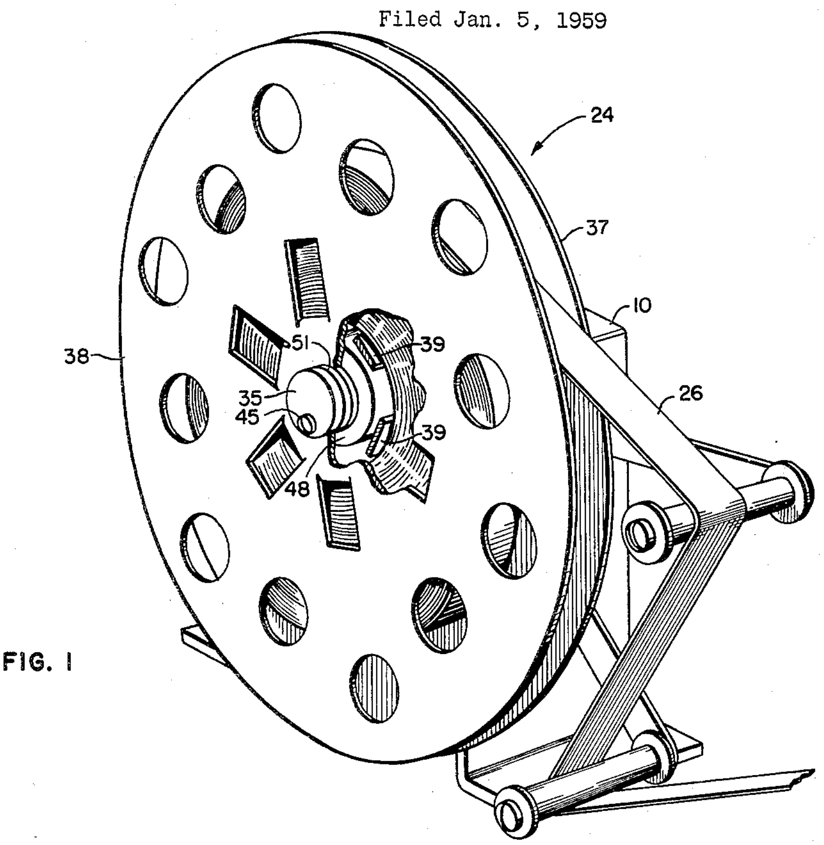
FIG. 1 is an isometric view of the tape reel having tape wound thereon, a portion of one disk being broken away for clarity.

The disk 37 forms one flange or head of the reel and it is preferably made of a non-magnetic material, such as aluminum or brass. Mounted slidably on the hub 35 is a disk 38 which serves as the other flange or head of the reel and is made of a magnetic material, such as steel or iron. Formed intergrally with the disk 38 are lugs or projections 39 which enter slots 40 formed in the disk 37, whereby rotation will be imparted to the disk 38 from the disk 37. As will be observed from FIGS. 1 and 2, the turns of tape are wound about the lugs or projections 39 and guided between the discs 37 and 38 to form a coil of tape. Without the use of any tools or the loosening of any mechanical parts, an operator may remove the disc 38 and the coil of tape wound upon the projections 39 merely by pulling the disc 38 axially off the hub 35. As the disc 38 is moved axially of the hub 35, the projections 39 will be disengaged from the slots 40. The disc 38 and the projections 39 thereon constitute a separable storage unit for storing the tape held thereby. Upon removal of a disc 38 carrying a coil of tape to be stored, another disc 38 having projections 39 can be slid into place on the driving means to accommodate another coil of tape. In many applications a large number of reels of tape are stored on their reels from day to day, and the provision of storing only one disc 38 with a coil of tape supported thereby realizes a large saving in inventory investment and the capability of changing discs 38 on the driving means without any mechanical operations realizes a saving in time by lessening the shutdown time of machine and the amount of operator attendance time.

A slot 32, designed to receive bowed leaf spring 43, is formed radially in the hub 35. The configuration of the normally bowed leaf spring 43 may be readily seen in FIG. 3. A threaded longitudinal bore 34 extends from the outer end of the hub 35 to the radial slot 32, and a screw 45 is provided to be inserted into the bore 34. Positioned slidably upon the hub 35, is an annular permanent magnet 48. As may be seen in FIG. 2, the magnet 48 may be locked in place in a predetermined position on the axis of the hub 35 by means of the leaf spring 43. When the screw 45 is threaded forwardly within the bore 44 into engagement with the leaf spring 43, the bowed leaf spring flattens and thereby expands radially of the hub to engage the inner surface of the annular magnet 48, and lock the magnet in a predetermined position longitudinally of the hub. Since the slidable disk 38 is made of magnetic material, the disk will be attracted to the positioned annular magnet whereby the slidable disk 38 will be positioned on the hub 35 a predetermined distance from the disk 37.

To assist in positioning the annular magnet 48 such that the reel 24 will be adjusted to accommodate properly tapes of various widths, peripheral grooves 51 are scribed on the hub 35. Each groove 51 in scribed on the hub 25 a distance, from the inner surface of the fixed disk 37, corresponding to one of the various widths of the tapes to be wound on the hub. Thus by utilizing the grooves 51 as a visual guide to position the annular magnet 48 axially on the hub 35, and thereby positioning the slidable disk 38 an operator can quickly and easily adjust the reel 24 to accommodate tapes of various widths.

It is manifest that many variations may be made in the present invention without departing from the spirit and scope thereof.

What is claimed is:

1. Apparatus for winding tapes of various widths, which comprises a shaft, a hub supported by said shaft and having a slot extending radially therein and a threaded longitudinal bore communicating with the radial slot and extending to one end of the hub, a nonmagnetic disk secured fixedly in a predetermined position longitudinally of the axis of the hub, a magnetic disk mounted slidably longitudinally of the axis of the hub and in combination with said nonmagnetic disk and said hub forming a reel, one of the disks having apertures formed therein and the other disk having projections secured substantially perpendicular thereto to enter said apertures and interlock the disks for rotation together, an annular magnet supported slidably longitudinally of the axis of the hub, a bowed leaf spring disposed in said radial slot, and a screw threaded into said bore from said one end of the hub and arranged to engage and flatten the leaf spring to cause expansion of the leaf spring radially of the hub and engagement of the leaf spring with the inner surface of the annular magnet to secure the magnet in a predetermined position along the axis of the shaft, said magnet comprising means for positioning and retaining said magnetic disk in any of a plurality of positions laterally of said nonmagnetic disk.

2. Apparatus for winding tapes of various widths, which comprises a rotatable shaft, a nonmagnetic hub secured to said shaft for rotation therewith, said hub having a slot extending radially therein and a threaded longitudinal bore communicating with the radial slot and extending to one end of the hub, a nonmagnetic disk secured fixedly in a predetermined position near the other end of the hub, a magnetic disk mounted slidably longitudinally of the axis of the hub and in combination with said nonmagnetic disk and said hub forming a reel, one of the disks having apertures formed therein and the other disk having projections extending substantially perpendicular thereto and entering said apertures to interlock the disks for rotation together, an annular magnet mounted slidably longitudinally of the axis of the hub such that the inner surface of the magnet covers the radial slot, a plurality of peripheral grooves scribed on the hub at distances from the nonmagnetic disk substantially equal to the widths of the various tapes to be wound to serve as guide marks for positioning said magnetic disk and annular magnet along the axis of the hub, a leaf spring tensioned to maintain a normally bowed condition, and disposed in said radial slot, and a screw threaded into said bore from said one end of the hub to flatten and expand the leaf spring radially of the hub and into engagement with the inner surface of the annular magnet to lock the magnet in a predetermined position along the axis of the hub, said magnet comprising means for positioning and retaining the magnetic disk in any of a plurality of positions by magnetic attraction of the magnetic disk.

3. A reel for winding tape comprising a non-magnetic rotatable hub, a first disc secured to said hub for rotation therewith, a second disc slidable longitudinally of the axis of the hub and positionable in a plurality of positions, said second disc having a portion composed of magnetic material, a magnet slidable on said hub and engaging the magnetic portion on said second disc, and locking means for locking said magnet in one of a plurality of positions.

4. A reel for winding tape which comprises a rotatable hub made of non-magnetic material, a first disc secured to said hub for rotation therewith, a second disc positionable in any of a plurality of positions along said hub to accommodate various widths of tape between said first and second discs, said second disc having a magnetic portion, means interconnecting said second disc to said first disc to prevent relative rotation therebetween, a magnet slidable on said hub and engagable with said magnetic portion of said second disc to hold said second disc against axial movement, and means to secure said magnet against movement.

5. A reel for winding tape which comprises a rotatable hub of non-magnetic material, a first disc on said hub, a second disc supported by said hub and movable to a plurality of positions to guide different widths of tape between said first and second discs, said second disc having a magnetic portion, means interconnecting said first and second discs to prevent relative rotation therebetween and upon which is wound the various widths of tape, a magnet carried on said hub and engaging said magnetic portion of said second disc to hold said second disc against axial movement, and means to preclude movement of said magnet and thereby movement of said second disc.

6. A reel for winding different widths of tape comprising a rotatable hub of non-magnetic material, a first disc carried on said hub for guiding one edge of a tape, a second disc having a portion of magnetic material thereon and slidably positionable on said hub, means interconnecting said first disc and second disc to prevent relative rotation therebetween and provide the surface upon which the tape is wound, a collar magnet slidable on said hub and positioned between said interconnecting means and said hub for engaging said magnetic portion of said second disc to hold said second disc against movement, and locking means to lock said magnet in any of a plurality of positions.

7. A separable reel for winding tape which comprises a non-magnetic rotatable hub, a first non-magnetic disc secured fixedly on the axis of said hub, a magnet mounted slidably and longitudinally of the axis on the hub, means to lock said magnet in a fixed position along the axis of said hub, and a second disc and core forming a separable unit upon which said tape is wound and stored, said second disc having a magnetic portion thereon to engage said magnet on said hub for magnetic attraction to said magnet to hold said second disc in proper relation to said first disc to guide therebetween the tape being wound on or unwound from the core.

References Cited in the file of this patent

UNITED STATES PATENTS

| | | |
|---|---|---|
| 1,179,924 | Howell | Apr. 18, 1916 |
| 1,284,499 | Wakefield | Nov. 12, 1918 |
| 2,017,636 | Smalley | Oct. 15, 1935 |
| 2,437,997 | Charlin | Mar. 16, 1948 |
| 2,465,631 | Bruestle | Mar. 29, 1949 |
| 2,702,165 | Wildman | Feb. 15, 1955 |
| 2,709,051 | Bunch | May 24, 1955 |